United States Patent
Moisel

(10) Patent No.: US 7,241,999 B2
(45) Date of Patent: Jul. 10, 2007

(54) USE OF A PHOTOVOLTAIC ELEMENT AS SENSOR FOR CHECKING THE FUNCTIONING OF TRANSMITTERS IN THE INFRARED RANGE

(75) Inventor: Joerg Moisel, Neu-Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 129 days.

(21) Appl. No.: 11/084,885

(22) Filed: Mar. 21, 2005

(65) Prior Publication Data
US 2005/0205787 A1    Sep. 22, 2005

(30) Foreign Application Priority Data
Mar. 19, 2004  (DE) .................. 10 2004 013 985
Sep. 17, 2004  (DE) .................. 10 2004 045 105

(51) Int. Cl.
*G01J 5/00*    (2006.01)
*G01J 1/42*    (2006.01)

(52) U.S. Cl. .................. 250/338.1; 250/354.1

(58) Field of Classification Search ............. 250/338.1, 250/354.1
See application file for complete search history.

(56) References Cited

U.S. PATENT DOCUMENTS

| | | | |
|---|---|---|---|
| 3,914,597 A | 10/1975 | Kaufman | |
| 3,966,325 A | 6/1976 | Mohler | |
| 4,902,887 A * | 2/1990 | Everett, Jr. | .................. 250/221 |
| 5,231,047 A * | 7/1993 | Ovshinsky et al. | ........... 438/96 |
| 5,499,024 A * | 3/1996 | Germanton et al. | ... 340/870.17 |
| 6,133,570 A * | 10/2000 | Schimert et al. | ......... 250/338.1 |
| 6,441,896 B1 | 8/2002 | Field | |
| 2004/0042070 A1* | 3/2004 | Yagi et al. | .................. 359/350 |

FOREIGN PATENT DOCUMENTS

DE    42 08 469 A1    9/1993
EP    0 407 166 A    1/1991

* cited by examiner

*Primary Examiner*—David Porta
*Assistant Examiner*—Mindy Vu
(74) *Attorney, Agent, or Firm*—Akerman Senterfitt; Stephan A. Pendorf; Yonghong Chen

(57) ABSTRACT

The present invention concerns the use of a photovoltaic element as sensor for checking the functionality of transmitters in the infrared range.

5 Claims, 1 Drawing Sheet

USE OF A PHOTOVOLTAIC ELEMENT AS SENSOR FOR CHECKING THE FUNCTIONING OF TRANSMITTERS IN THE INFRARED RANGE

BACKGROUND OF THE INVENTION

1. Field of the Invention

The invention concerns the use of a photovoltaic element as sensor for testing the functioning of transmitters in the infrared range.

2. Related Art of the Invention

Conventional radiation measurement devices can be employed for carrying out tests of the functioning of, in particular, headlights of motor vehicles in the infrared range. This type of photometer always has only a limited surface upon which a precise measurement is possible. Further, a measurement is possible mainly in the region of lower power. The headlights in infrared range play a role in applications in motor vehicles in systems for improving visibility in darkness.

A further function check of headlights is provided by the evaluation of a camera image. If no camera image is presented, then in this case it must first be determined whether it is the headlight or the camera that is defective. Further, it is not possible to undertake a quantitative measurement of the radiation power or output of the headlight.

Likewise, no quantitative measurement is possible in infrared vision devices (image transformers).

With the naked eye the infrared radiation cannot be verified for checked for test purposes. For safety reasons looking into the headlight should be absolutely avoided.

SUMMARY OF THE INVENTION

The present invention is concerned with the problem of testing an infrared headlight with respect to its functioning.

This task is solved in accordance with the present invention by the use of a photovoltaic element as sensor for testing the functioning of emitters in the infrared range.

It has been found advantageous, that an effective sensor can be produced with limited technical investment, with readily accessible materials, and at low cost. A photovoltaic element represents a large surface area sensor, with which a larger surface area of multiple 100 $cm^2$ can be produced without problem. It is further been found advantageous that no energy supply need be provided for the measurement instrument itself.

The measurement can be made integral over this surface area, in that the total available electrical output is measured. It is also possible to carry out a precise measurement with respect to individual spatial angles when the photovoltaic element is comprised of multiple individual cells of which the signals are separately evaluated.

The evaluation can occur for example by connection to a simple moving coil instrument. Using a suitable evaluation electronic circuit, a signal can be produced, of which the output signal is proportional to the beam power.

Conventional silicon solar cells can be employed.

It has been found that, as a result of the present invention, an effective sensor can be provided at economical cost.

In an example of use, the sensor is employed for checking the functioning of infrared headlights of motor vehicles.

It has been found particularly advantageous herein, that the sensor is economical and readily available, since it is therewith also made possible to equip individual service stations with appropriate sensors for carrying out a functionality test.

In a further example of the use of the inventive device, by use of an aperture or shutter only a partial area of the emitter is evaluated.

According to a further example of use, a filter is provided in front of the photovoltaic element, which makes it possible to shield visible light partially or completely from the impinging upon the photovoltaic element, in comparison to which the infrared radiation passes through the filter unimpeded or substantially unimpeded or, as the case may be, substantial parts of the infrared radiation are unimpeded or substantially unimpeded from passing through the filter and can impinge upon the photovoltaic element. Thereby a very reliable check of functionality of emitters in the infrared range is ensured.

It has been found particularly advantageous to employ an inventive photovoltaic element in the functionality check of infrared headlights for vehicles, which routinely or regularly require an inspection at a motor vehicle service station so that even a slight possibility of interference of other traffic participants by a malfunctioning of the infrared headlight is precluded or minimized. Therein the employment of this photovoltaic element for checking the functionality of an infrared vehicle headlight has been found particularly useful, since these can be constructed very simply and very robustly and thus can provide very reliable information regarding the functionality of the vehicle headlight.

Thereby it is also advantageous to measure the emission profile with respect to the individual spatial angles.

BRIEF DESCRIPTION OF THE DRAWINGS

One illustrated embodiment of the invention is shown in the figures. Therein there is shown.

DETAILED DESCRIPTION OF THE INVENTION

Figure 1:
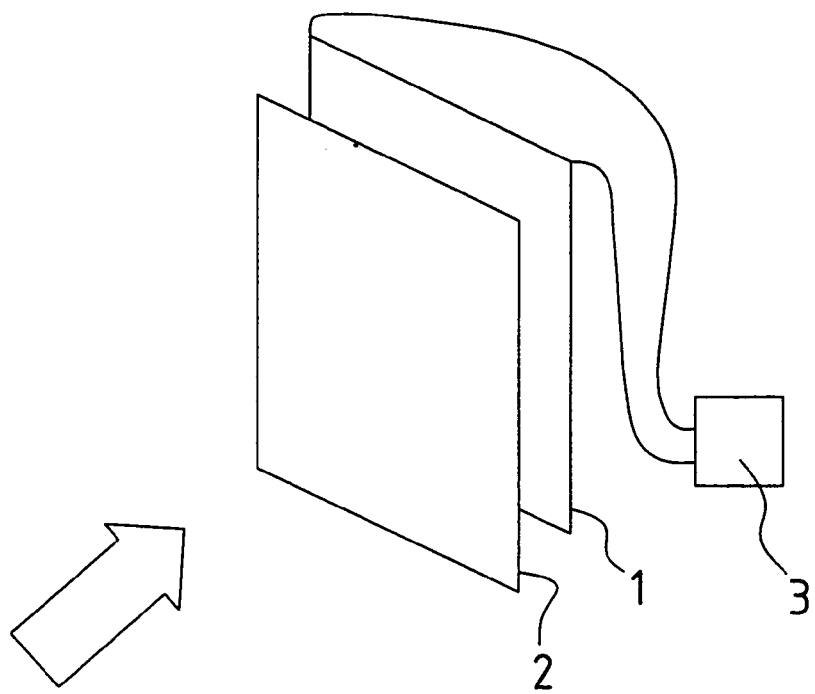
FIG. 1 a first sensor array for integral measurement.

FIG. 1 shows a first sensor array for integral measurement of the beam power. Therein a photovoltaic element 1 can be seen, which could be, for example, a normal silicon solar cell. Further, a plastic VIS-filter 2 is provided in front of the photovoltaic element 1, which is transmissive only for light in the infrared range.

A galvanometer 3 is connected to the photovoltaic element 1.

With the shown sensor element the beam power of an infrared headlight can be measured. In order to provide quantitative information, it is further necessary to know the distance to the infrared headlight, in order to ensure that the beam power of the headlight is fully acquired by the photovoltaic element.

Figure 2:
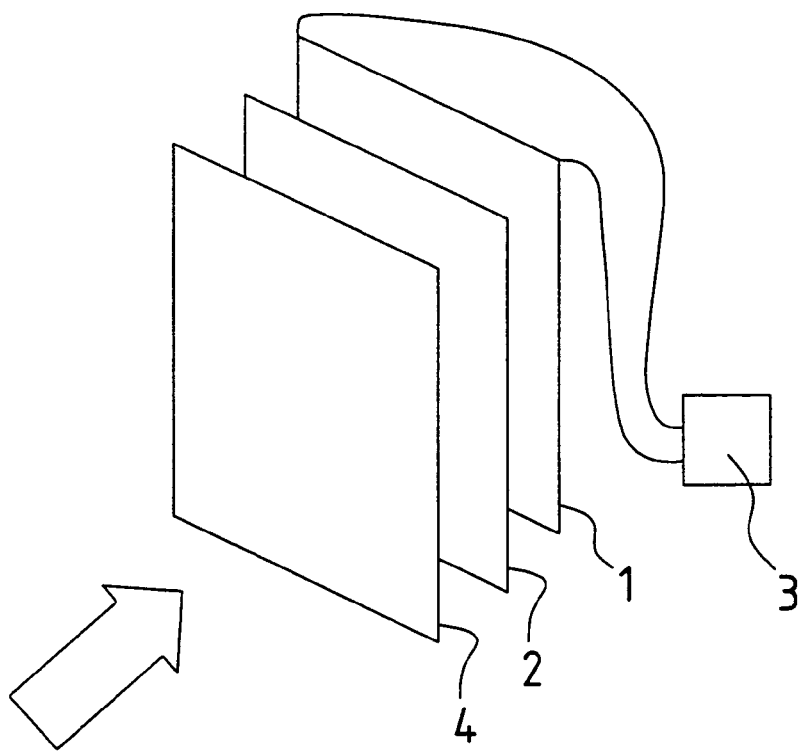
FIG. 2 an additional sensor array for measurement of an emission profile.

FIG. 2 shows a further sensor array. Therein a shield 4 is provided in addition to the elements shown in FIG. 1. By this shield the emission power is allowed to pass through in only a certain spatial angle. By the appropriate positioning of the shield the corresponding data for the different spatial angular areas can be separately detected.

The invention claimed is:

1. A method for testing the functionality of emitters in the infrared range, said method comprising:
   providing a photovoltaic element (1) as sensor for testing the functionality of emitters in the infrared range,
   connecting to said photovoltaic element a device for detecting the output of said photovoltaic element,
   irradiating at least a part of the surface area of said sensor with infrared radiation from an infrared radiation emitter,
   determining the functionality of said emitter as a function of the signal detected by said detectors,
   wherein the sensor is used for checking the functionality of an infrared headlight of a motor vehicle.

2. The method according to claim 1, wherein the photovoltaic element (1) is associated with a filter, which is transmissive for infrared radiation and is at least partially non-transmissive for visible light.

3. The method according to claim 1, wherein the photovoltaic element (1) includes multiple cells separated spatially from each other, of which the signals can be separately evaluated.

4. The method according to claim 3, wherein multiple signals are separately evaluated to allow determination of spatial infrared radiation distribution.

5. A method for testing the functionality of emitters in the infrared range, said method comprising:
   providing a photovoltaic element (1) as sensor for testing the functionality of emitters in the infrared range,
   connecting to said photovoltaic element a device for detecting the output of said photovoltaic element,
   irradiating at least a part of the surface area of said sensor with infrared radiation from an infrared radiation emitter,
   determining the functionality of said emitter as a function of the signal detected by said detector,
   wherein a shield (4) is used to evaluate only a partial area of the transmitter.

* * * * *